(12) United States Patent
Ryoo et al.

(10) Patent No.: US 12,540,851 B2
(45) Date of Patent: Feb. 3, 2026

(54) SEMICONDUCTOR DEVICE MEASURING DEVICE AND METHOD FOR MEASURING SEMICONDUCTOR DEVICE

(71) Applicant: SAMSUNG ELECTRONICS CO., LTD., Suwon-si (KR)

(72) Inventors: Hyun Woo Ryoo, Suwon-si (KR); Da Hee Yoon, Gwangju (KR); Jung Hoon Byun, Seoul (KR); Dong-Ryul Lee, Goyang-si (KR); Woo Yun Lee, Hwaseong-si (KR); Dong Chul Ihm, Suwon-si (KR); Chung Sam Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 508 days.

(21) Appl. No.: 17/827,231

(22) Filed: May 27, 2022

(65) Prior Publication Data

US 2023/0101968 A1 Mar. 30, 2023

(30) Foreign Application Priority Data

Sep. 29, 2021 (KR) .................. 10-2021-0128908

(51) Int. Cl.
*G01J 3/44* (2006.01)
*G01N 21/65* (2006.01)
*G01N 21/95* (2006.01)

(52) U.S. Cl.
CPC ............ *G01J 3/4412* (2013.01); *G01N 21/65* (2013.01); *G01N 21/9501* (2013.01)

(58) Field of Classification Search
CPC .... G01J 3/4412; G01N 21/65; G01N 21/9501

USPC .................. 356/301, 237.2–237.6, 614–624
See application file for complete search history.

(56) References Cited

U.S. PATENT DOCUMENTS

| | | | |
|---|---|---|---|
| 6,013,928 A | 1/2000 | Yamazaki et al. | |
| 6,320,655 B1* | 11/2001 | Matsushita | G01N 21/9501 356/614 |
| 6,407,373 B1* | 6/2002 | Dotan | H01J 37/21 257/E29.267 |

(Continued)

FOREIGN PATENT DOCUMENTS

| | | |
|---|---|---|
| CN | 109142313 A | 1/2019 |
| JP | 2010-156678 A | 7/2010 |

*Primary Examiner* — Isiaka O Akanbi
(74) *Attorney, Agent, or Firm* — Sughrue Mion, PLLC

(57) ABSTRACT

A semiconductor device measuring device includes: a light generator which generates light; a polarizer which polarizes the light; a wafer stage including a first load port on which an undoped reference wafer is loaded, and a second load port on which a doped sample wafer is loaded, the wafer stage being movable to first and second positions at which the polarized light is incident on the reference wafer and the sample wafer, respectively; a spectroscope which collects first and second Raman spectral information of light reflected from the reference and sample wafers, respectively; a photodetector which detects first and second Raman scattering signals based on the first and second Raman spectral information, respectively; a spectrum corrector which corrects the second Raman scattering signal using the first Raman scattering signal; and a controller which calculates a concentration of the dopant of the sample wafer using the corrected scattering signal.

20 Claims, 13 Drawing Sheets

(56) References Cited

U.S. PATENT DOCUMENTS

| | | | |
|---|---|---|---|
| 6,919,260 | B1 | 7/2005 | Umezawa et al. |
| 7,116,469 | B2 | 10/2006 | Bragheri et al. |
| 7,173,699 | B2 | 2/2007 | Xu et al. |
| 7,583,378 | B2 | 9/2009 | Rezac et al. |
| 7,675,614 | B2 * | 3/2010 | Sekiya .............. G01N 21/94 |
| | | | 356/237.4 |
| 7,808,634 | B2 | 10/2010 | Nelson et al. |
| 2007/0030478 | A1 * | 2/2007 | Kim ............... G01N 21/9501 |
| | | | 356/237.2 |
| 2011/0125326 | A1 | 5/2011 | Bosco et al. |
| 2017/0248528 | A1 * | 8/2017 | Blaine .............. G01N 21/55 |
| 2019/0226995 | A1 | 7/2019 | Mason |
| 2019/0323887 | A1 * | 10/2019 | Ishihara ............ G01J 3/28 |
| 2021/0033541 | A1 * | 2/2021 | Chou ............. H01L 21/67288 |

\* cited by examiner

SEMICONDUCTOR DEVICE MEASURING DEVICE AND METHOD FOR MEASURING SEMICONDUCTOR DEVICE

CROSS-REFERENCE TO RELATED APPLICATION

This application claims is based on and claims priority under 35 U.S.C. § 119 to Korean Patent Application No. 10-2021-0128908, filed on Sep. 29, 2021 in the Korean Intellectual Property Office, the disclosure of which is incorporated by reference herein in its entirety.

BACKGROUND

1. Field

Example embodiments of the present disclosure relate to a semiconductor device measuring device and a method of measuring a semiconductor device.

2. Description of Related Art

In recent years, as the size of a device has decreased to several nanometers, a technique for measuring a desired measurement target of a semiconductor device using Raman spectroscopy has been studied.

SUMMARY

One or more example embodiments provide a semiconductor device measuring device having improved accuracy and reliability.

One or more example embodiments also provide a semiconductor device measuring method having improved accuracy and reliability.

According to an aspect of an example embodiment, there is provided a semiconductor device measuring device including: a light generator configured to generate light; a polarizer configured to polarize the light; a wafer stage including a first load port on which a reference wafer that is not doped with a dopant is loaded, and a second load port on which a sample wafer that is doped with the dopant is loaded, the wafer stage being configured to be movable to a first position at which the polarized light is incident on the reference wafer and a second position at which the polarized light is incident on the sample wafer; a spectroscope configured to collect first Raman spectral information of light reflected from the reference wafer when the wafer stage is at the first position, and collects second Raman spectral information of light reflected from the sample wafer when the wafer stage is at the second position; a photodetector configured to detect a first Raman scattering signal based on the first Raman spectral information and to detect a second Raman scattering signal based on the second Raman spectral information; and at least one processor including: a spectrum corrector configured to generate a corrected scattering signal by correcting the second Raman scattering signal on a basis of the first Raman scattering signal; and a controller configured to determine a concentration of the dopant of the sample wafer based on the corrected scattering signal.

According to an aspect of an example embodiment, there is provided a semiconductor device measuring device including: a wafer stage comprising a first load port on which a reference wafer that is not doped with a dopant is loaded, and a second load port on which a sample wafer that is doped with the dopant is loaded; a polarizer configured to be rotated and to adjust a polarization direction of a second incident light incident on the sample wafer; a photodetector configured to detect a second Raman scattering signal from a second reflected light reflected from the sample wafer; and at least one processor configured to: determine a first rotation angle based on an intensity of the second Raman scattering signal according to a rotation angle of the polarizer, control the wafer stage to move so that first incident light is incident on the reference wafer, and control the polarizer to rotate to the first rotation angle to adjust a polarization direction of the first incident light incident on the reference wafer, wherein the photodetector is further configured to detect a first Raman scattering signal from first reflected light reflected from the reference wafer, and wherein the at least one processor is further configured to determine a concentration of the dopant doped in the sample wafer based on the first Raman scattering signal and the second Raman scattering signal according to the first rotation angle.

According to an aspect of an example embodiment, there is provided a method for measuring a semiconductor device, the method including: moving a wafer stage, which includes a first load port on which a reference wafer that is not doped with a dopant is loaded and a second load port on which a sample wafer that is doped with the dopant is loaded, so that light is incident on the reference wafer; collecting first Raman spectral information of light reflected from the reference wafer; detecting a first Raman scattering signal based on the first Raman spectral information; moving the wafer stage so that the light is incident on the sample wafer; collecting second Raman spectral information of light reflected from the sample wafer; detecting a second Raman scattering signal based on the second Raman spectral information; generating a corrected scattering signal by correcting the second Raman scattering signal based on the first Raman scattering signal; and determining a concentration of the dopant of the sample wafer based on the corrected scattering signal.

However, aspects of the disclosure are not restricted to those set forth herein. The above and other aspects of the disclosure will become more apparent to one of ordinary skill in the art to which the disclosure pertains by referencing the detailed description of the disclosure given below.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
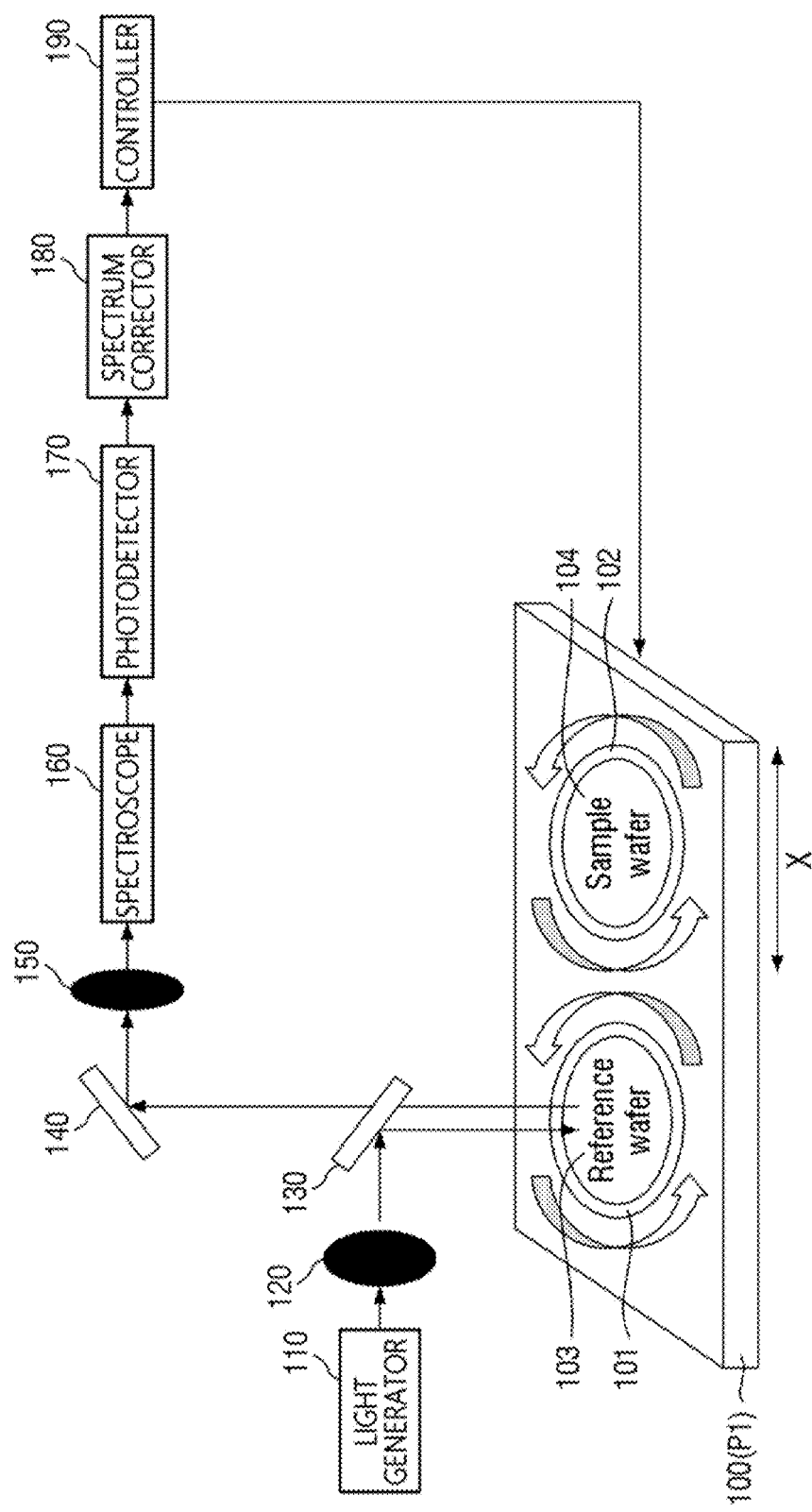
FIGS. 1 and 2 are diagrams for explaining a semiconductor device measuring device according to some example embodiments.
Figure 2:
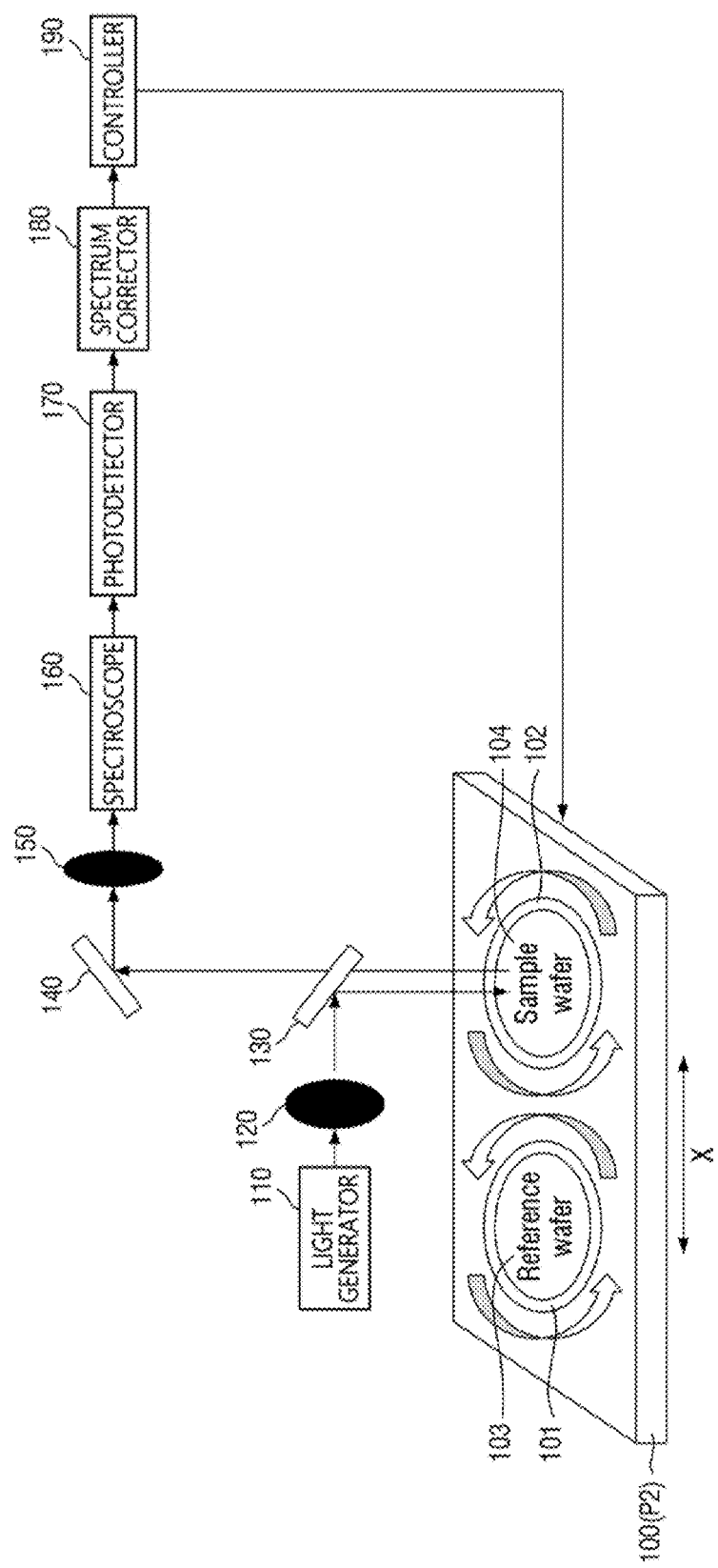
Figure 3:
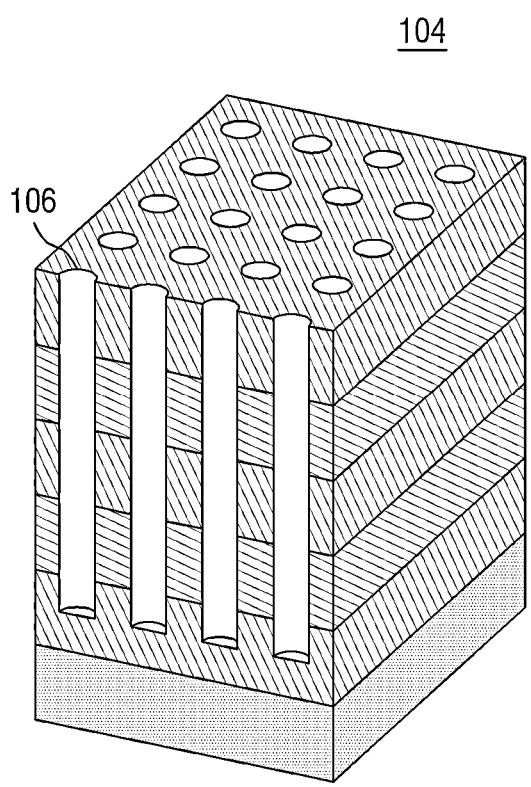
FIG. 3 is a diagram for explaining a sample wafer according to some example embodiments.
Figure 4:
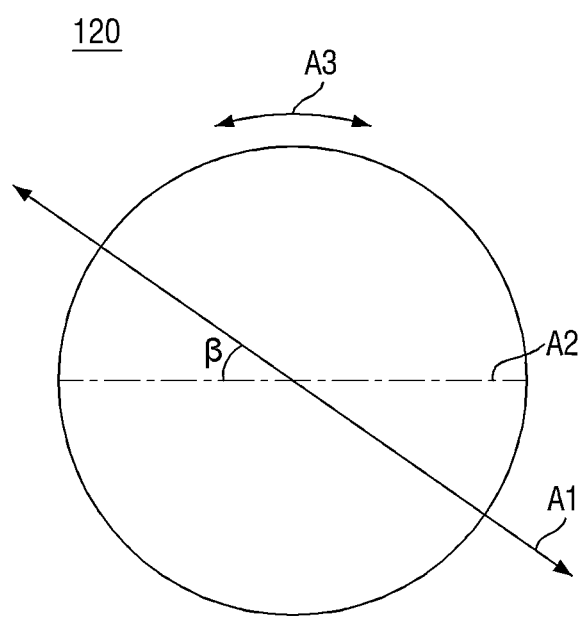
FIG. 4 is a diagram for explaining a polarizer of FIGS. 1 and 2.

FIGS. 1 and 2 are diagrams for explaining a semiconductor device measuring device according to some example embodiments. FIG. 3 is a diagram for explaining a sample wafer according to some example embodiments. FIG. 4 is a diagram for explaining a polarizer of FIGS. 1 and 2.

Referring to FIGS. 1 and 2, the semiconductor device measuring device according to some example embodiments may include a wafer stage 100, a light generator 110, a polarizer 120, a beam splitter 130, a mirror 140, a filter 150, a spectroscope 160, a photodetector 170, a spectrum corrector 180, and a controller 190. The spectrum corrector 180 and the controller 190 may be implemented by at least one processor.

The wafer stage 100 may include a first load port 101 and a second load port 102 that are spaced apart from each other. A reference wafer 103 may be loaded onto the first load port 101, and a sample wafer 104 may be loaded onto the second load port 102.

The reference wafer 103 may be a wafer that is not doped with a dopant, and the sample wafer 104 may be a wafer that is doped with the dopant. The reference wafer 103 and the sample wafer 104 may be silicon wafers for manufacturing the semiconductor device.

In some embodiments, upper surfaces of the reference wafer 103 and the sample wafer 104 may be flat. That is, the reference wafer 103 and the sample wafer 104 may be bare wafers that have not been subjected to a patterning process.

In some embodiments, a semiconductor device may be formed on the sample wafer 104. For example, referring to FIG. 3, the semiconductor device including a plurality of channel holes 106 may be formed on the sample wafer 104. Alternatively, a semiconductor device such as a fin type transistor (FinFET), a gate all-around transistor (GAA FET) including a nanowire-shaped or nanosheet-shaped channel area, a tunneling transistor (tunneling FET), a bipolar junction transistor, and a laterally-diffused metal-oxide semiconductor (LDMOS) may be manufactured on the sample wafer 104. Examples of the semiconductor devices manufactured on the sample wafer 104 are not limited thereto.

The wafer stage 100 may be movable in an X direction. The wafer stage 100 may move in the X direction by the control of the controller 190. The wafer stage 100 may be moved to a first position P1 (see, e.g., FIG. 1) and a second position P2 (see, e.g., FIG. 2) by the control of the controller 190. The first position P1 may be a position at which the light to be described later is incident on the reference wafer 103, and the second position P2 may be a position at which the light is incident on the sample wafer 104. Therefore, the semiconductor device measuring device according to some embodiments does not require an operator to directly move the positions of the reference wafer 103 and the sample wafer 104. Further, the operator only needs to load each of the reference wafer 103 and the sample wafer 104 to the first and second load ports 101 and 102 only once, without the need to load the reference wafer 103 into the load port and then measure the reference wafer 103, and to unload the reference wafer 103 and load the sample wafer 104 to measure the sample wafer 104. Accordingly, the measurement time is shortened and the semiconductor device may be measured more easily.

The first load port 101 and the second load port 102 may be rotatable on the wafer stage 100.

The light generator 110 may generate light. The light generator 110 may be, for example, a laser apparatus that irradiates a laser including a plurality of wavelengths.

The polarizer 120 may polarize the light, by allowing only a component of the light incident from the light generator 110 that vibrates in a specific direction to pass and outputting the light.

Referring to FIG. 4, the polarizer 120 may be, for example, a rotational polarizer. The polarizer 120 may allow only the component of the light incident from the light generator 110 that vibrates in the same direction as a polarizing axis A1 to pass. The polarizer 120 rotates in an A3 direction, and may change a rotation angle β with respect to the optical axis A2 of the polarizer 120. This makes it possible to change the polarization direction.

Referring to FIGS. 1 and 2 again, the beam splitter 130 may allow a part of the polarized light from the polarizer 120 to pass, and reflect the other part to provide it to the reference wafer 103 or the sample wafer 104. Further, the beam splitter 130 may allow a part of the light reflected from the reference wafer 103 (e.g., first reflected light) or the sample wafer 104 (e.g., second reflected light) to pass and provide it to the mirror 140, and may reflect the other part of the light.

Referring to FIG. 1, when the wafer stage 100 is at the first position P1, the light reflected from the beam splitter 130 may be irradiated to the reference wafer 103, and light reflected from the reference wafer 103 may pass through the beam splitter 130 and be provided to the mirror 140.

Referring to FIG. 2, when the wafer stage 100 is at the second position P2, the light reflected from the beam splitter 130 may be irradiated to the sample wafer 104, and light reflected from the sample wafer 104 may pass through the beam splitter 130 and be provided to the mirror 140.

The mirror 140 may change a traveling direction of the light passing through the beam splitter 130. The mirror 140 may reflect the light that has passed through the beam splitter 130 and provide it to the filter 150.

The filter 150 may remove the light component of the light provided from the mirror 140 of the same wavelength band as the light generated from the light generator 110. For example, the filter 150 may be a notch filter.

The spectroscope 160 may collect Raman spectral information of the light provided from the mirror 140. For example, the spectroscope 160 may collect Raman spectral information by spatially separating the light provided from the mirror 140 for each wavelength.

Referring to FIG. 1, when the wafer stage 100 is at the first position P1, the spectroscope 160 may collect the first Raman spectral information of the light reflected from the reference wafer 103. Referring to FIG. 2, when the wafer stage 100 is at the second position P2, the spectroscope 160 may collect the second Raman spectral information of the light reflected from the sample wafer 104.

The spectroscope 160 may include, for example, a monochromator and/or diffraction grating.

The photodetector 170 may detect a Raman scattering signal based on the Raman spectral information collected through the spectroscope 160. For example, the photodetector 170 may receive a Raman scattered light separated by the spectroscope 160 for each wavelength.

Referring to FIG. 1, when the wafer stage 100 is at the first position P1, the photodetector 170 may detect a first Raman scattering signal based on the first Raman spectral information. Referring to FIG. 2, when the wafer stage 100 is at the second position P2, the photodetector 170 may detect a second Raman scattering signal based on second Raman spectral information.

The photodetector 170 may include a photo diode, a photo transistor, an image sensor (charge-coupled device (CCD) image sensor, and a complementary metal-oxide semiconductor (CMOS) image sensor), and the like. The photodetector 170 does not necessarily need to be made up of one element, and a plurality of elements may be configured in the form of an array.

The spectrum corrector 180 may generate a corrected scattering signal in which the second Raman scattering signal is corrected on the basis of the first Raman scattering signal detected from the photodetector 170.

In the semiconductor device measuring device according to some embodiments, the spectrum corrector 180 may store the first Raman scattering signal and the second Raman scattering signal. Alternatively, in the semiconductor device measuring device according to some embodiments, the first Raman scattering signal and the second Raman scattering signal may be stored in separate memory or controller 190, and the spectrum corrector 180 may read the first Raman scattering signal and the second Raman scattering signal from the separate memory or controller 190 to generate a corrected scattering signal. Therefore, since the spectrum corrector 180 may generate the corrected scattering signal from the raw data of the first Raman scattering signal and the second Raman scattering signal, the semiconductor device measuring device according to some embodiments may generate a more accurate corrected scattering signal.

The controller 190 may calculate the concentration of the dopant doped in the sample wafer 104 on the basis of the corrected scattering signal.

For example, the controller 190 may perform a fitting operation on the corrected scattering signal to generate a graph. The controller 190 may calculate data from the graph to extract information about the dopant concentration. The data may include, for example, at least one of a peak position of the spectrum, a peak intensity, a maximum value of a peak height, a minimum value of the peak height, a half width of the spectrum (FWHM, Full Width at Half Maximum), a peak area, an asymmetry of the spectrum, and the like. The controller 190 may calculate the concentration of the dopant doped in the sample wafer 104 from the calculated data.

The controller 190 may further include a display unit that outputs the graph, the data, the dopant concentration, and the like.

Figure 5:
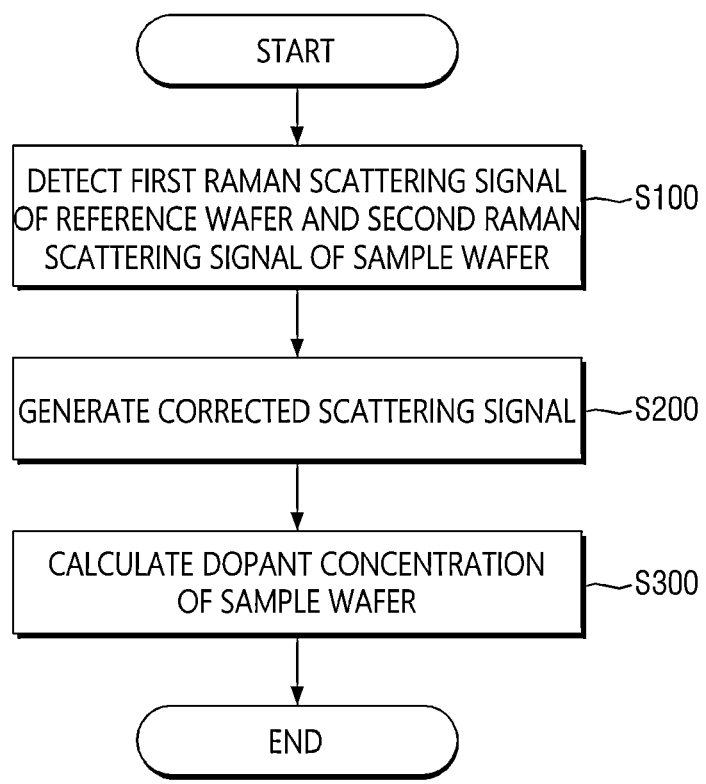
FIG. 5 is a flowchart for explaining an operating method of the semiconductor device measuring device according to some example embodiments.

FIG. 5 is a flowchart for explaining an operating method of the semiconductor device measuring device according to some embodiments.

Referring to FIG. 5, the first Raman scattering signal of the reference wafer and the second Raman scattering signal of the sample wafer may be detected (S100). The spectrum corrector (180 of FIGS. 1 and 2) may generate a corrected scattering signal obtained by correcting the second Raman scattering correction signal, on the basis of the detected first Raman scattering signal (S200). The controller (190 of FIGS. 1 and 2) may calculate the concentration of the dopant doped in the sample wafer (104 of FIGS. 1 and 2) on the basis of the corrected scattering signal (S300).

The first Raman scattering signal of the reference wafer may fluctuate due to a shortened life of the light generated from the light generator (110 of FIGS. 1 and 2), aging of the semiconductor device measuring device, and the like. Therefore, correction of the second Raman scattering signal based on an existing (e.g., previously determined) measured first Raman scattering signal is highly likely to be erroneous and reproducibility decreases.

However, the semiconductor device measuring device according to some embodiments may detect the first Raman scattering signal of the reference wafer, and generate a correction scattering signal obtained by correcting the second Raman scattering correction signal based on the first Raman scattering signal. Therefore, since the first Raman scattering signal of the reference wafer is detected each time, the dopant concentration of the sample wafer may be calculated more accurately, and the reproducibility may be improved or enhanced.

Figure 6:
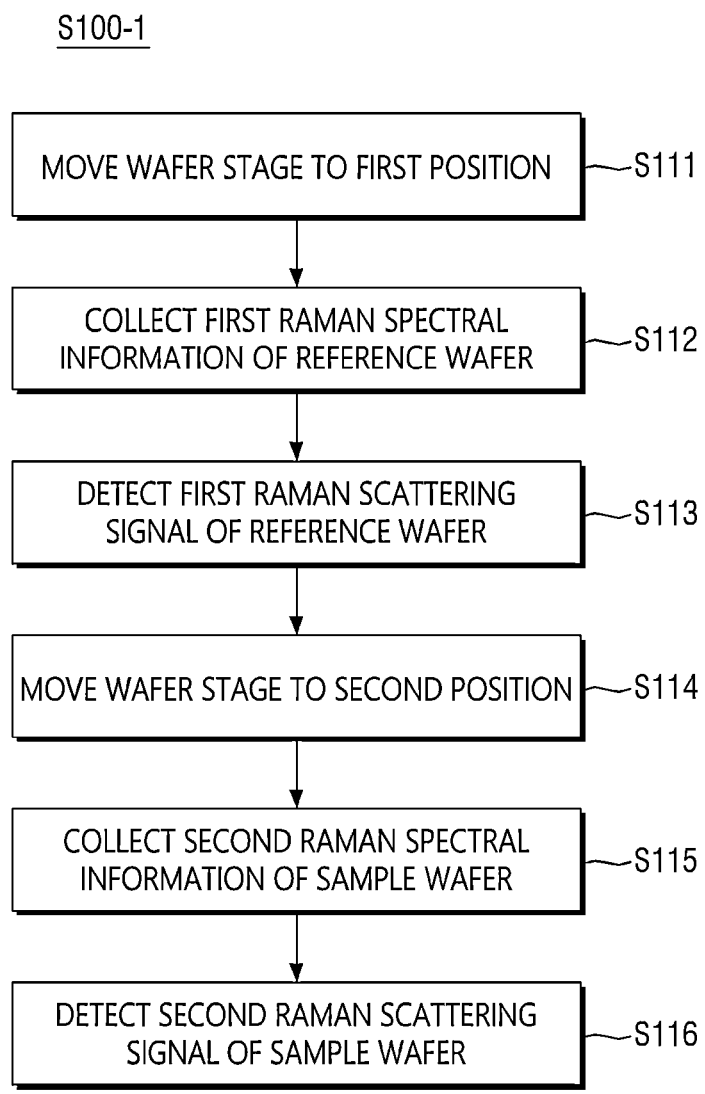
FIG. 6 is a flowchart for explaining a step S100 of FIG. 5 according to some example embodiments.

FIG. 6 is a flowchart for explaining a step S100 of FIG. 5 according to some embodiments.

Referring to FIGS. 1 and 6, the wafer stage 100 may be moved to the first position P1 (S111). The spectroscope 160 may collect the first Raman spectral information of the light reflected from the reference wafer 103 (S112). The photodetector 170 may detect the first Raman scattering signal on the basis of the first Raman spectral information of the light reflected from the reference wafer 103 (S113).

Next, referring to FIGS. 2 and 6, the wafer stage 100 may be moved to the second position P2 (S114). The spectroscope 160 may collect the second Raman spectral information of the light reflected from the sample wafer 104 (S115). The photodetector 170 detects the second Raman scattering signal on the basis of the second Raman spectral information of the light reflected from the sample wafer 104 (S116).

Although it has been described that steps S111 to S113 are sequentially performed and then steps S114 to S116 are performed, the disclosure is not limited thereto. After performing the steps S114 to S116, the steps S111 to S113 may be sequentially performed.

Figure 7:
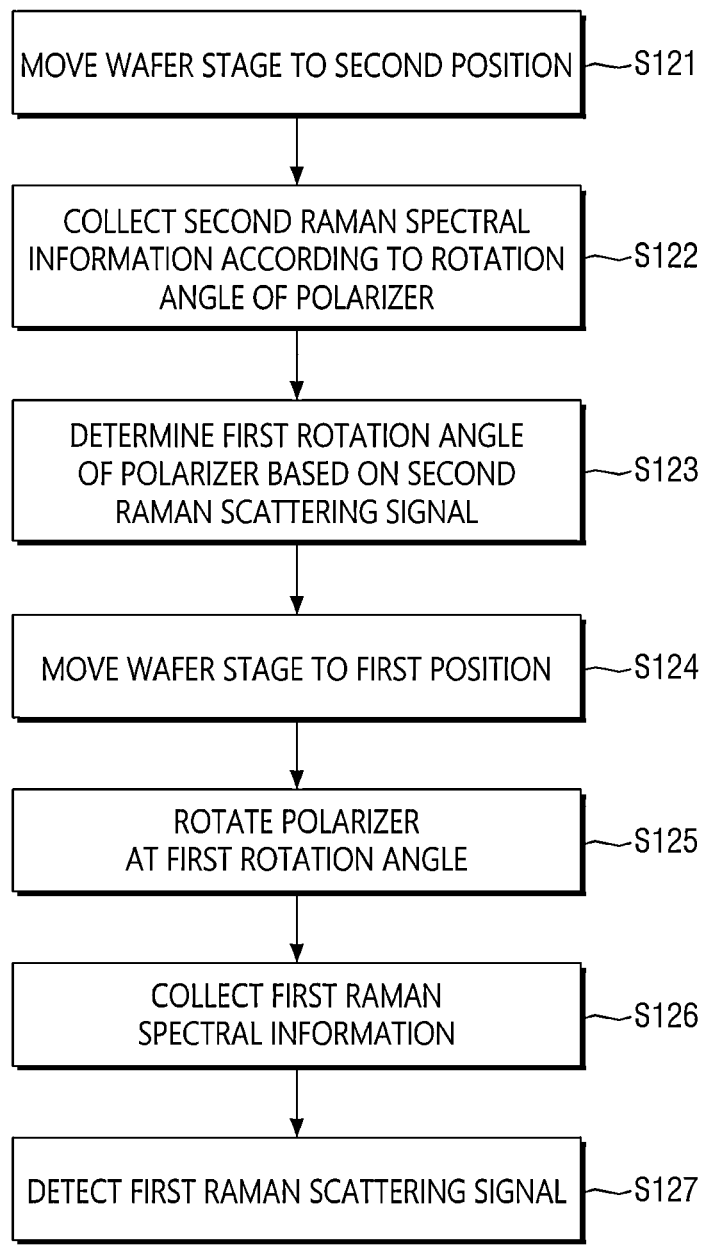
FIG. 7 is a flowchart for explaining the step S100 of FIG. 5 according to some example embodiments.
Figure 8:
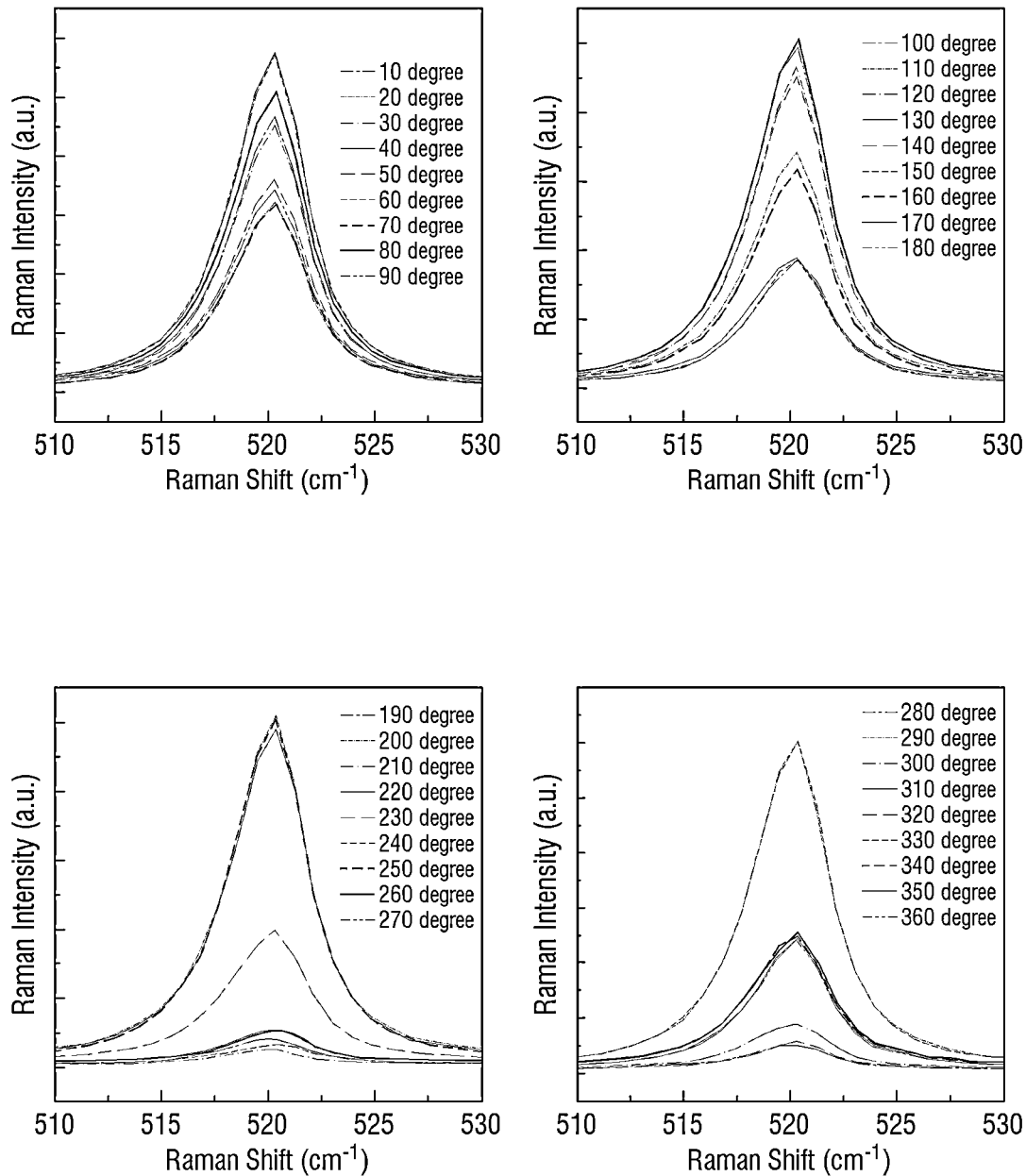
FIGS. 8 and 9 are diagrams for explaining a step S122 of FIG. 7.
Figure 9:
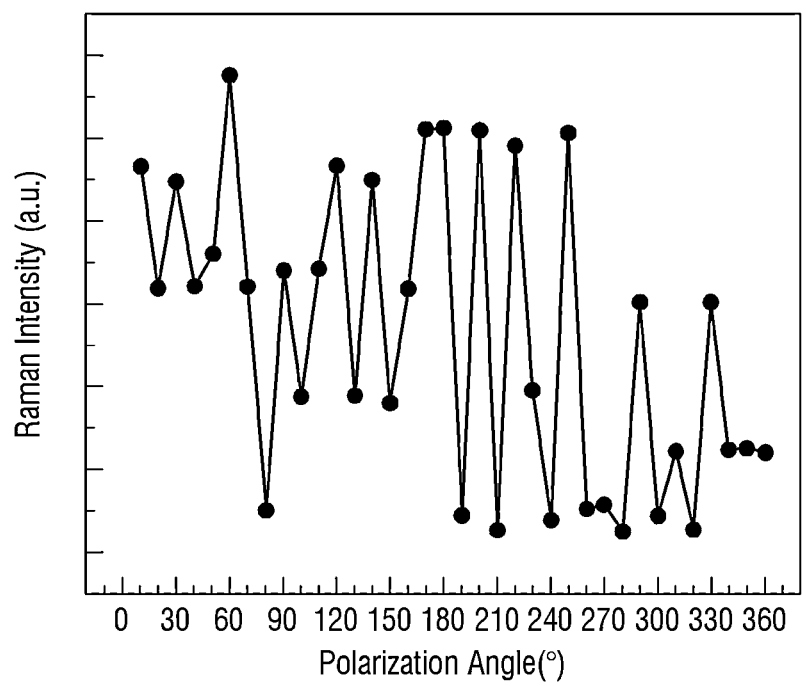

FIG. 7 is a flowchart for explaining a step S100 of FIG. 5 according to some example embodiments. FIGS. 8 and 9 are diagrams for explaining a step S122 of FIG. 7.

Referring to FIGS. 2 and 7, the wafer stage 100 may be moved to the second position P2 at which light is incident on the sample wafer 104 (S121).

The controller 190 may collect the second Raman scattering signal according to the rotation angle of the polarizer 120 (S122).

For example, after the polarizer 120 rotates at the first angle by the control of the controller 190, the spectroscope 160 may collect the second Raman spectral information of the light reflected from the sample wafer 104 in the light passing through the polarizer 120 rotated to the first angle, and the photodetector 170 may detect the second Raman scattering signal according to the first angle from the second Raman spectral information. In this way, the controller 190 may rotate the polarizer 120 at various angles to collect Raman scattering signals according to various angles.

FIG. 8 is an example of the Raman scattering signals according to various angles. Referring to FIG. 8, the controller 190 may, for example, rotate the polarizer 120 in units of 10 degrees. The controller 190 may show the Raman scattering signal according to the rotation angle of the polarizer 120.

The controller 190 may determine the maximum magnitude of the Raman scattering signal as a first rotation angle of the polarizer 120, for example, 60 degrees. Alternatively, the controller 190 may rotate the polarizer 120 at all angles to show the Raman scattering signal.

Referring to FIGS. 2 and 7 again, the controller 190 may determine the first rotation angle of the polarizer 120 based on the second Raman scattering signal according to the rotation angle of the polarizer 120 (S123). The controller 190 may determine an optimum angle for measuring the concentration of the dopant doped in the sample wafer 104 as the first rotation angle.

For example, referring to FIG. 9, the controller 190 may show the intensity of the Raman scattering signal according to the rotation angle. The controller 190 may determine the rotation angle when the magnitude of the second Raman scattering signal is the greatest among the second Raman scattering signals according to the rotation angle of the polarizer 120, as the first rotation angle.

The wafer stage 100 may be moved to the first position P1 at which the light is incident on the reference wafer 103 (S124).

The polarizer 120 may rotate to the first rotation angle by the control of the controller 190 (S125).

The spectroscope 160 may collect the first Raman spectral information of the light reflected from the sample wafer 104 in the light passing through the polarizer 120 rotated to the first rotation angle (S126).

The polarizer 120 may detect the first Raman scattering signal according to the first rotation angle from the first Raman spectral information (S127).

Since the semiconductor device measuring method according to some embodiments adjusts the rotation angle of the polarizer 120 and utilizes the Raman scattering signal having the maximum magnitude, the concentration of the fine dopant doped in the sample wafer 104 can be calculated more accurately.

For example, when a semiconductor device having a three-dimensional structure is formed on the sample wafer 104 as in FIG. 3, the Raman scattering signal sensitivity may change depending on the incident direction of light. The semiconductor device measuring method according to some embodiments may adjust the rotation angle of the polarizer 120 to calculate the concentration of the dopant doped in the sample wafer 104 more accurately, even when the semiconductor device having the three-dimensional structure is formed.

Figure 10:
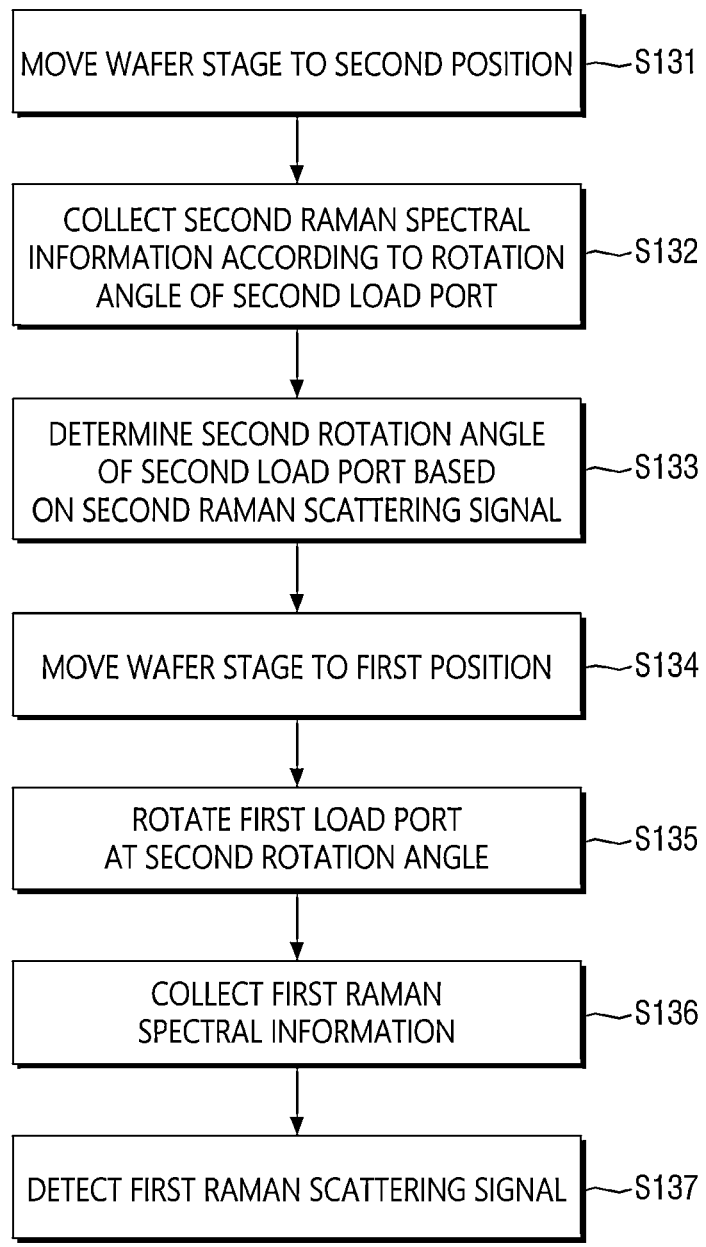
FIG. 10 is a flowchart for explaining step the S100 of FIG. 5 according to some example embodiments.
Figure 11:
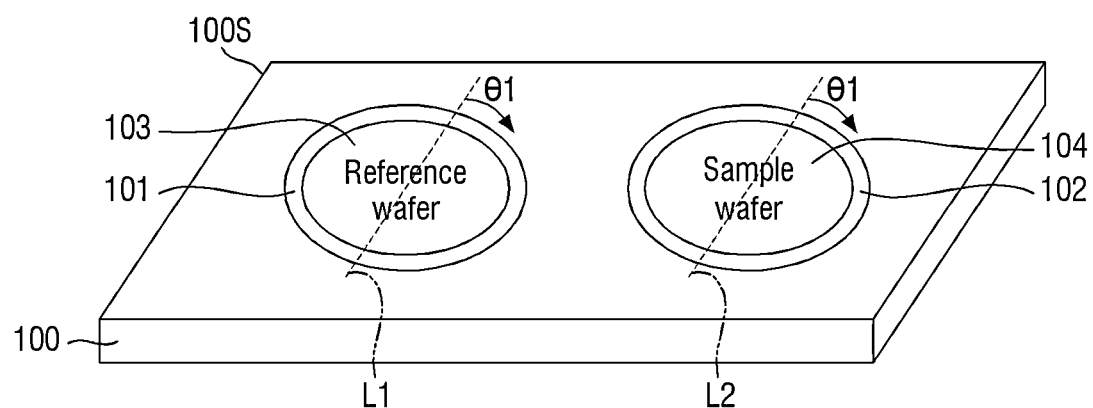
FIG. 11 is a diagram for explaining the operation of the semiconductor device measuring device according to some example embodiments.

FIG. 10 is a flowchart for explaining the step S100 of FIG. 5 according to some example embodiments. FIG. 11 is a diagram for explaining the operation of the semiconductor device measuring device according to some example embodiments.

Referring to FIGS. 2 and 10, the wafer stage 100 may be moved to the second position P2 at which light is incident on the sample wafer 104 (S131).

The controller 190 may collect a second Raman scattering signal according to the rotation angle (that is, an azimuth) of the second load port 102 (S132).

For example, referring to FIG. 11, the second load port 102 may rotate to a second angle θ1 by the control of the controller 190, and the sample wafer 104 may thereby rotate to the second angle. The second load port 102 may rotate to the second angle θ1 with respect to a first center line L1 parallel to one side wall 100S of the wafer stage 100. By rotation of the second load port 102, the sample wafer 104 may rotate in a direction of 0 degree or more and 360 degrees or less.

The spectroscope 160 may collect the second Raman spectral information of the light reflected from the sample wafer 104 rotated to the second angle, and the photodetector 170 may collect the second Raman spectral information according to the second angle from the second Raman spectral information. In this way, the controller 190 may rotate the second load port 102 at various angles to collect the Raman scattering signals according to various angles.

Referring to FIGS. 1 and 10, the controller 190 may determine a second rotation angle of the second load port 102 on the basis of the second Raman scattering signal according to the rotation angle of the second load port 102 (S133).

The controller 190 may determine the optimum angle for measuring the concentration of the dopant doped in the sample wafer 104 as the second rotation angle. For example, the controller 190 may determine the rotation angle when the magnitude of the second Raman scattering signal is the greatest among the second Raman scattering signals according to the rotation angle of the second load port 102, as the second rotation angle.

The wafer stage 100 may be moved to the first position P1 at which the light is incident on the reference wafer 103 (S134).

The first load port 101 may rotate to the second rotation angle by the control of the controller 190 (S135). For example, referring to FIG. 10, the first load port 101 may rotate to the second angle by the control of the controller 190, and the reference wafer 103 may thereby rotate to the second angle. The first load port 101 may rotate to the second rotation angle with respect to a second center line L2 parallel to one side wall 100S of the wafer stage 100. The second center line L2 may be parallel to the first center line L1.

The spectroscope 160 may collect the first Raman spectral information of the light reflected from the reference wafer 103 among the light passing through the polarizer 120 rotated to the second rotation angle (S136).

The polarizer 120 may detect a first Raman scattering signal according to the second rotation angle from the first Raman spectral information (S137).

For example, when the semiconductor device having the three-dimensional structure is formed on the sample wafer 104 as in FIG. 3, the Raman scattering signal sensitivity may change depending on the incident direction of light. In the semiconductor device measuring method according to some embodiments, by rotating the first load port 101 and the second load port 102, the sample wafer 104 and the reference wafer 103 may be rotated to 0 degree or more and 360 degrees or less. Therefore, even when the semiconductor device having the three-dimensional structure is formed on the sample wafer 104, the concentration of the dopant doped in the sample wafer 104 may be calculated more accurately.

Figure 12:
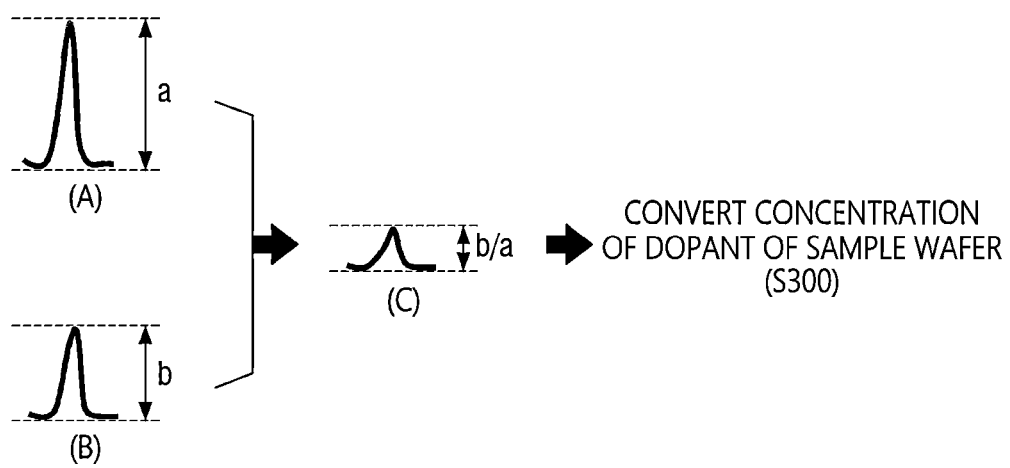
FIGS. 12 and 13 are diagrams for explaining steps S200 and S300 of FIG. 5.
Figure 13:
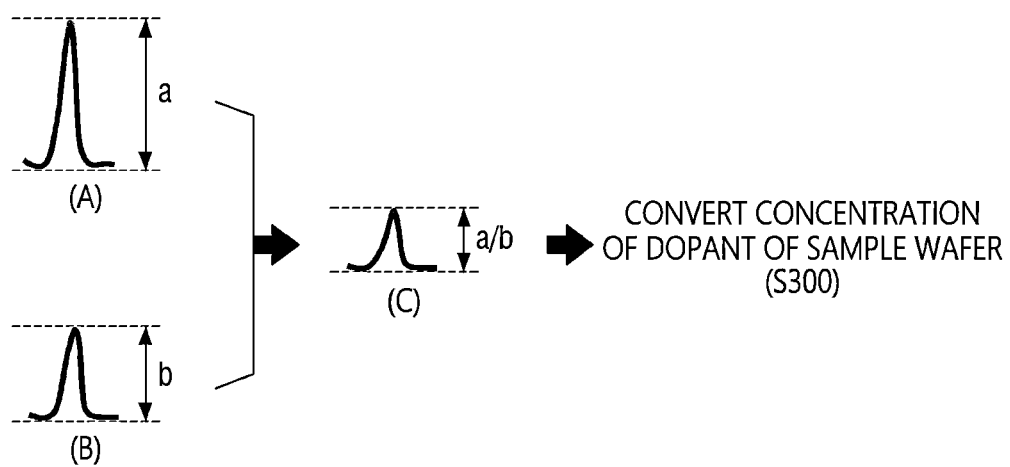

FIGS. 12 and 13 are diagrams for explaining steps S200 and S300 of FIG. 5.

Referring to FIGS. 12 and 13, a corrected scattering signal C may be generated by correcting the second Raman scattering signal B of the sample wafer on the basis of the first Raman scattering signal A of the reference wafer.

For example, referring to FIG. 12, the corrected scattering signal C may be generated by dividing the second Raman scattering signal B by the first Raman scattering signal A.

For example, referring to FIG. 13, the corrected scattering signal C may be generated by dividing the first Raman scattering signal A by the second Raman scattering signal B.

The spectrum corrector (180 of FIGS. 1 and 2) may convert the concentration of the dopant doped in the sample wafer, on the basis of the corrected scattering signal C, using a correlation equation between the concentration of the dopant and the Raman scattering signal (S300).

Figure 14:
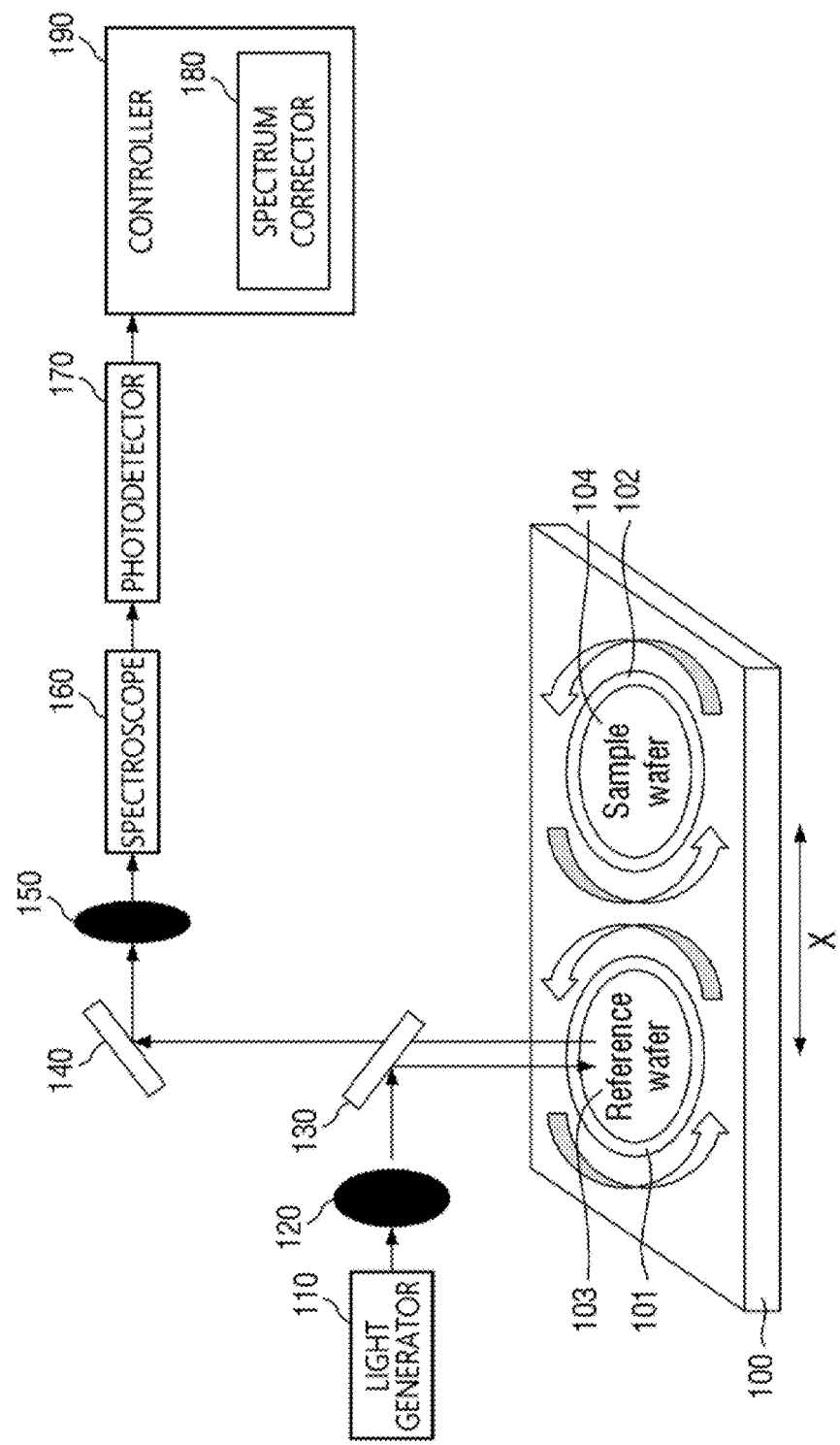
FIG. 14 is a diagram for explaining the semiconductor device measuring device according to some example embodiments.

FIG. 14 is a diagram for explaining the semiconductor device measuring device according to some example embodiments. For convenience of explanation, points different from those described referring to FIGS. 1 and 2 will be mainly described.

Referring to FIG. 14, in the semiconductor device measuring device according to some embodiments, the spectrum corrector 180 may be included in the controller 190. The spectrum corrector 180 is implemented in software and may be driven by the controller 190. In other words, the spectrum corrector 180 and the controller 190 may both be implemented by a single processor.

It will be understood that many variations and modifications may be made to the example embodiments without substantially departing from the principles of the present disclosure. Therefore, the disclosed example embodiments are used in a generic and descriptive sense only and not for purposes of limitation.

What is claimed is:

1. A semiconductor device measuring device comprising:
a light generator configured to generate light;
a polarizer configured to polarize the light;
a wafer stage comprising a reference wafer that is not doped with a dopant loaded on a first load port, and a sample wafer that is doped with the dopant loaded on a second load port, the second load port being spaced apart from the first load port in a parallel direction that is parallel to an upper surface of the reference wafer, the wafer stage being configured to be movable in the parallel direction and configured to be movable to a first position at which the polarized light is incident on the reference wafer and a second position at which the polarized light is incident on the sample wafer;
a spectroscope configured to collect first Raman spectral information of light reflected from the reference wafer when the wafer stage is at the first position, and collects second Raman spectral information of light reflected from the sample wafer when the wafer stage is at the second position;
a photodetector configured to detect a first Raman scattering signal based on the first Raman spectral information and to detect a second Raman scattering signal based on the second Raman spectral information; and
at least one processor comprising:
a spectrum corrector configured to generate a corrected scattering signal by correcting the second Raman scattering signal on a basis of the first Raman scattering signal; and
a controller configured to determine a concentration of the dopant of the sample wafer based on the corrected scattering signal,
wherein the controller is further configured to:
set a second rotation angle based on an intensity of the second Raman scattering signal, and
control the first load port to rotate to the second rotation angle to rotate the reference wafer to the second rotation angle.

2. The semiconductor device measuring device of claim 1, wherein the controller is further configured to:
set a first rotation angle based on an intensity of the second Raman scattering signal, and
control the polarizer to rotate to the first rotation angle to polarize the light.

3. The semiconductor device measuring device of claim 1, wherein the first load port and the second load port are rotatable.

4. The semiconductor device measuring device of claim 1, wherein the controller is configured to set the second rotation angle based on the intensity of the second Raman scattering signal by:
obtaining a plurality of second Raman scattering signals respectively corresponding to a plurality of rotation angles of the second load port, the plurality of rotation angles being different from each other,
determine a second Raman scattering signal having a maximum magnitude among the plurality of second Raman scattering signals; and
set the second rotation angle to the rotation angle among the plurality of rotation angles that corresponds to the second Raman scattering signal having the maximum magnitude.

5. The semiconductor device measuring device of claim 1, wherein the controller is further configured to divide the second Raman scattering signal by the first Raman scattering signal to generate the corrected scattering signal.

6. The semiconductor device measuring device of claim 1, wherein the controller is further configured to multiply the second Raman scattering signal by the first Raman scattering signal to generate the corrected scattering signal.

7. The semiconductor device measuring device of claim 1, further comprising:
a semiconductor device formed on the sample wafer.

8. The semiconductor device measuring device of claim 1, wherein an upper surface of the sample wafer is flat.

9. The semiconductor device measuring device of claim 1, wherein the spectrum corrector and the controller are implemented in a single processor.

10. A semiconductor device measuring device comprising:
a wafer stage comprising a reference wafer that is not doped with a dopant loaded on a first load port, and a sample wafer that is doped with the dopant loaded on a second load port, the second load port being spaced apart from the first load port in a parallel direction that is parallel to an upper surface of the reference wafer, the wafer stage being configured to be movable in the parallel direction and configured to be movable to a first position at which a first incident light is incident on the reference wafer on the first load port and a second position at which a second incident light is incident on the sample wafer on the second load port;
a polarizer configured to be rotated and to adjust a polarization direction of the second incident light incident on the sample wafer when the wafer stage is at the second position;
a photodetector configured to detect a second Raman scattering signal from a second reflected light reflected from the sample wafer; and
at least one processor configured to:
determine a first rotation angle based on an intensity of the second Raman scattering signal according to a rotation angle of the polarizer,
control the wafer stage to move to the first position so that the first incident light is incident on the reference wafer, and
control the polarizer to rotate to the first rotation angle to adjust a polarization direction of the first incident light incident on the reference wafer when the reference wafer is at the first position,
wherein the photodetector is further configured to detect a first Raman scattering signal from first reflected light reflected from the reference wafer, wherein the at least one processor is further configured to determine a concentration of the dopant doped in the sample wafer based on the first Raman scattering signal and the second Raman scattering signal according to the first rotation angle, and wherein the at least one processor is configured to determine the first rotation angle based on the intensity of the second Raman scattering signal according to the rotation angle of the polarizer by:

obtaining a plurality of second Raman scattering signals respectively corresponding to a plurality of rotation angles of the polarizer, the plurality of rotation angles being different from each other, determining a second Raman scattering signal having a maximum magnitude among the plurality of second Raman scattering signals;

setting the first rotation angle to the rotation angle among the plurality of rotation angles that corresponds to the second Raman scattering signal having the maximum magnitude.

11. The semiconductor device measuring device of claim 10, wherein the first load port and the second load port are rotatable.

12. The semiconductor device measuring device of claim 10, wherein the at least one processor is further configured to control the second load port to rotate the sample wafer, wherein the photodetector is further configured to detect the second Raman scattering signal from the second reflected light reflected by the rotated sample wafer, wherein the at least one processor is further configured to:
determine a second rotation angle based on the intensity of the second Raman scattering signal according to a rotation angle of the sample wafer, and
control the wafer stage to rotate to the second rotation angle to rotate the reference wafer, and wherein the photodetector is further configured to detect the first Raman scattering signal from the first reflected light reflected by the rotated reference wafer.

13. The semiconductor device measuring device of claim 10, wherein the at least one processor is further configured to:

divide the second Raman scattering signal by the first Raman scattering signal to generate a corrected scattering signal; and determine the concentration of the dopant doped in the sample wafer based on the corrected scattering signal.

14. The semiconductor device measuring device of claim 10, wherein the at least one processor is further configured to:

multiply the second Raman scattering signal by the first Raman scattering signal to generate a corrected scattering signal; and determine the concentration of the dopant doped in the sample wafer based on the corrected scattering signal.

15. A method for measuring a semiconductor device, the method comprising:

moving a wafer stage to a first position, the wafer stage including a reference wafer that is not doped with a dopant loaded on a first load port and a sample wafer that is doped with the dopant loaded on a second load port, the second load port being spaced apart from the first load port in a parallel direction that is parallel to an upper surface of the reference wafer, the wafer stage being configured to be movable in the parallel direction and configured to be movable to the first position at which light is incident on the reference wafer on the first load port and a second position at which the light is incident on the sample wafer on the second load port;

collecting first Raman spectral information of light reflected from the reference wafer;

detecting a first Raman scattering signal based on the first Raman spectral information;

moving the wafer stage in the parallel direction to the second position so that the light is incident on the sample wafer;

collecting second Raman spectral information of light reflected from the sample wafer;

detecting a second Raman scattering signal based on the second Raman spectral information;

generating a corrected scattering signal by correcting the second Raman scattering signal based on the first Raman scattering signal; and determining a concentration of the dopant of the sample wafer based on the corrected scattering signal, wherein the method further comprises setting a second rotation angle based on an intensity of the second Raman scattering signal, and controlling the first load port to rotate to the second rotation angle to rotate the reference wafer to the second rotation angle.

16. The method for measuring the semiconductor device of claim 15, wherein the moving of the wafer stage to the second position comprises:

polarizing the light using a polarizer; and moving the wafer stage to the second position so that the polarized light is incident on the sample wafer, and wherein the method further comprises determining a first rotation angle of the polarizer based on an intensity of the second Raman scattering signal.

17. The method for measuring the semiconductor device of claim 16, wherein the moving of the wafer stage to the first position comprises:

polarizing the light, using the polarizer rotated to the first rotation angle, and moving the wafer stage to the first position so that the polarized light is incident on the reference wafer.

18. The method for measuring the semiconductor device of claim 15, wherein the moving of the wafer stage to the second position comprises rotating the second load port to cause the light to be incident on the sample wafer loaded onto the rotated second load port, and wherein the method further comprises determining a second rotation angle of the second load port based on an intensity of the second Raman scattering signal.

19. The method for measuring the semiconductor device of claim 18, wherein the moving of the wafer stage to the first position comprises rotating the first load port to the second rotation angle to cause the light to be incident on the reference wafer loaded on the rotated first load port.

20. The method for measuring the semiconductor device of claim 15, wherein the determining of the concentration of the dopant of the sample wafer based on the corrected scattering signal comprises dividing the second Raman scattering signal by the first Raman scattering signal to generate the corrected scattering signal.

* * * * *